US010828964B2

(12) United States Patent
Chopko et al.

(10) Patent No.: US 10,828,964 B2
(45) Date of Patent: Nov. 10, 2020

(54) REDISTRIBUTION OF CONDENSATE FOR INCREASED COOLING CAPACITY

(71) Applicant: Carrier Corporation, Palm Beach Gardens, FL (US)

(72) Inventors: Robert A. Chopko, Baldwinsville, NY (US); Ciara Poolman, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 133 days.

(21) Appl. No.: 16/079,429

(22) PCT Filed: Feb. 22, 2017

(86) PCT No.: PCT/US2017/018870
§ 371 (c)(1),
(2) Date: Aug. 23, 2018

(87) PCT Pub. No.: WO2017/147148
PCT Pub. Date: Aug. 31, 2017

(65) Prior Publication Data
US 2019/0047370 A1    Feb. 14, 2019

Related U.S. Application Data

(60) Provisional application No. 62/298,663, filed on Feb. 23, 2016.

(51) Int. Cl.
*B60H 1/32* (2006.01)
*F25B 29/00* (2006.01)
(Continued)

(52) U.S. Cl.
CPC ......... *B60H 1/3211* (2013.01); *B60H 1/3233* (2013.01); *B60H 1/32331* (2019.05);
(Continued)

(58) Field of Classification Search
CPC ............. B60H 1/3211; B60H 1/32331; B60H 1/3233; B60H 2001/00307; F25B 39/028;
(Continued)

(56) References Cited

U.S. PATENT DOCUMENTS 2,218,596 A    10/1940  Ashley
2,941,382 A    6/1960   Wuesthoff
(Continued)

FOREIGN PATENT DOCUMENTS

CN    2336250 Y    9/1999
CN    2823894 Y    10/2006
(Continued)

OTHER PUBLICATIONS

International Search Report for International Application No. PCT/US2017/018870; International Filing Date Feb. 22, 2017; dated Mar. 30, 2017; 6 Pages.
(Continued)

*Primary Examiner* — Steve S Tanenbaum
(74) *Attorney, Agent, or Firm* — Cantor Colburn LLP

(57) ABSTRACT

A heating, ventilation, air conditioning and refrigeration (HVAC&R) unit includes an evaporator circulating a flow of refrigerant therethrough to cool a flow of compartment air flowing over the evaporator, and a condenser operably connected to the evaporator to condense the flow of refrigerant therethrough. The evaporator and the condenser are relatively positioned such that a liquid condensate at an exterior of the evaporator is directed by gravity onto an exterior of the condenser to increase an operating capacity of the condenser.

14 Claims, 4 Drawing Sheets

(51) Int. Cl.
*F25B 39/02* (2006.01)
*F25B 39/04* (2006.01)
*B60H 1/00* (2006.01)
*F28D 21/00* (2006.01)
*F24F 13/22* (2006.01)

(52) U.S. Cl.
CPC .......... *F25B 29/003* (2013.01); *F25B 39/022* (2013.01); *F25B 39/028* (2013.01); *F25B 39/04* (2013.01); *B60H 2001/00307* (2013.01); *F24F 2013/225* (2013.01); *F25B 2339/041* (2013.01); *F28D 2021/0085* (2013.01)

(58) Field of Classification Search
CPC .............. F25B 39/022; F25B 2339/041; F24F 2013/225
USPC .......................................................... 62/272
See application file for complete search history.

(56) References Cited

U.S. PATENT DOCUMENTS

| | | | |
|---|---|---|---|
| 3,811,293 A | 5/1974 | Flynn | |
| 3,834,451 A | 9/1974 | Kozinski | |
| 4,067,205 A | 1/1978 | Mayhue | |
| 4,212,172 A | 7/1980 | Manno | |
| 4,266,406 A | 5/1981 | Ellis | |
| 4,280,334 A | 7/1981 | Lakdawala | |
| 5,682,757 A | 11/1997 | Peterson | |
| 5,979,172 A | 11/1999 | Teller | |
| 6,085,539 A | 7/2000 | Meyer | |
| 6,318,108 B1 | 11/2001 | Holstein et al. | |
| 6,463,751 B1 | 10/2002 | Teller | |
| 6,761,039 B1 | 7/2004 | Gray | |
| 7,013,658 B2 | 3/2006 | Dobmeier et al. | |
| 7,150,160 B2 | 12/2006 | Herbert | |
| 7,854,141 B1 | 12/2010 | Breen | |
| 2004/0055324 A1 | 3/2004 | Gupta | |
| 2008/0256970 A1 | 10/2008 | Huang | |
| 2013/0133351 A1* | 5/2013 | Kil | F24F 1/02 62/291 |
| 2014/0069134 A1 | 3/2014 | Grabon | |
| 2016/0372978 A1 | 12/2016 | Ichikawa et al. | |

FOREIGN PATENT DOCUMENTS

| | | |
|---|---|---|
| EP | 2597383 A2 | 5/2013 |
| JP | 2009035206 | 2/2009 |
| WO | 2015186850 A1 | 10/2015 |

OTHER PUBLICATIONS

Written Opinion for International Application No. PCT/US2017/018870; International Filing Date Feb. 22, 2017; dated Mar. 30, 2017; 7 Pages.

R. Sawan, K. Ghali & M. Al-Hindi (2012) Use of condensate drain to pre-cool the inlet air to the condensers: A technique to improve the performance of split air-conditioning units, HVAC&R Research, 18:3, 417-431.

* cited by examiner

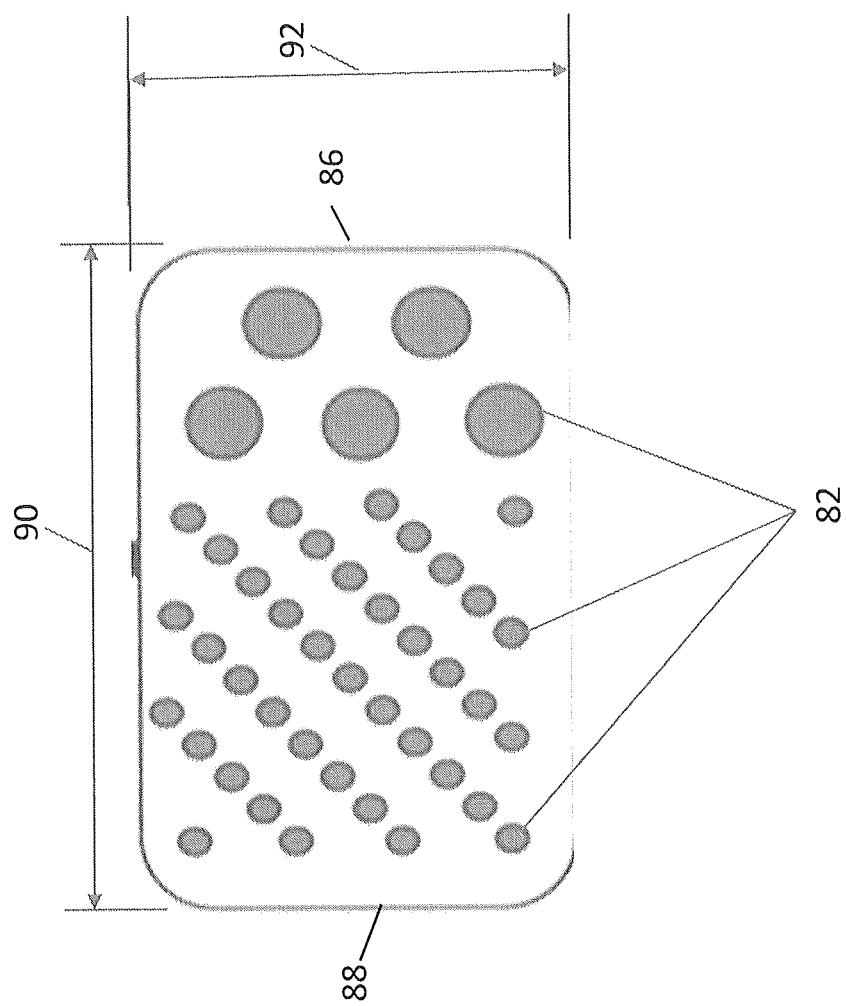

REDISTRIBUTION OF CONDENSATE FOR INCREASED COOLING CAPACITY

CROSS REFERENCE TO RELATED APPLICATIONS

This application is a National Stage application of PCT/US2017/018870, filed Feb. 22, 2017, which claims the benefit of U.S. Provisional Application No. 62/298,663, filed Feb. 23, 2016, both of which are incorporated by reference in their entirety herein.

BACKGROUND

The subject matter disclosed herein relates generally to the field of heating, ventilation, air conditioning and refrigeration (HVAC&R) systems, and more particularly, to HVAC&R systems utilized in transportation refrigeration.

Refrigerant vapor compression systems are well known in the art and commonly used for conditioning air to be supplied to a climate controlled comfort zone within a residence, office building, hospital, school, restaurant or other facility. Refrigerant vapor compression systems are also commonly used in refrigerating air supplied to display cases, merchandisers, freezer cabinets, cold rooms or other perishable/frozen product storage area in commercial establishments. Refrigerant vapor compression systems are also commonly used in transportation refrigeration systems for refrigerating air supplied to a temperature controlled cargo space of a truck, trailer, container or the like for transporting perishable/frozen items by truck, rail, ship or intermodally.

In typical heating, ventilation, air conditioning and refrigeration (HVAC&R) systems, such as those utilized in transportation refrigeration, condensate from an evaporator of the HVAC&R system is simply discarded as a byproduct of the cooling process. Additionally, capacity of the HVAC&R system is limited by the capacity of the various components of the system, such as a compressor, condenser, expansion device and the evaporator. In order to increase overall cooling capacity within the HVAC&R system, without significantly increasing the size, complexity or cost of the HVAC&R system, an increase in capacity of at least one of the components of the HVAC&R system is required.

BRIEF SUMMARY

In one embodiment, a heating, ventilation, air conditioning and refrigeration (HVAC&R) unit includes an evaporator circulating a flow of refrigerant therethrough to cool a flow of compartment air flowing over the evaporator, and a condenser operably connected to the evaporator to condense the flow of refrigerant therethrough. The evaporator and the condenser are relatively positioned such that a liquid condensate at an exterior of the evaporator is directed by gravity onto an exterior of the condenser to increase an operating capacity of the condenser.

Additionally or alternatively, in this or other embodiments an evaporator fan directs a first airflow across the evaporator and a condenser fan directs a second airflow across the condenser. One or more of the evaporator fan and the condenser fan are positioned between the evaporator and the condenser in a path of the liquid condensate to distribute the liquid condensate over a condenser surface.

Additionally or alternatively, in this or other embodiments a first distribution plate is located between the evaporator and the condenser in a path of the liquid condensate. The first distribution plate includes plurality of first distribution plate openings. The plurality of first distribution openings are configured and arranged to evenly distribute the liquid condensate over a condenser surface.

Additionally or alternatively, in this or other embodiments the first distribution plate is positioned non-parallel to the condenser surface.

Additionally or alternatively, in this or other embodiments the first distribution plate openings vary in one or more of size, spacing or shape to evenly distribute the liquid condensate over the condenser surface.

Additionally or alternatively, in this or other embodiments a second distribution plate is located between the first distribution plate and the condenser in the path of the liquid condensate. The second distribution plate includes a second distribution plate opening to direct liquid condensate collected at the second distribution plate onto the first distribution plate.

Additionally or alternatively, in this or other embodiments the second distribution plate is positioned nonparallel to the first distribution plate and nonparallel to the condenser surface.

Additionally or alternatively, in this or other embodiments the first distribution plate is positioned at a first angle to the condenser surface equal and opposite to a second angle of the second distribution plate to the condenser surface.

In another embodiment, a temperature controlled cargo compartment includes a cargo compartment suitable for transporting a cargo and a heating, ventilation, air conditioning and refrigeration (HVAC&R) unit operably connected to the cargo compartment. The HVAC&R unit includes an evaporator circulating a flow of refrigerant therethrough to cool a flow of compartment air flowing over the evaporator to cool the cargo compartment and a condenser operably connected to the evaporator to condense the flow of refrigerant therethrough. The evaporator and the condenser are relatively positioned such that a liquid condensate at an exterior of the evaporator is directed by gravity onto an exterior of the condenser to increase an operating capacity of the condenser.

Additionally or alternatively, in this or other embodiments an evaporator fan directs a first airflow across the evaporator and a condenser fan to direct a second airflow across the condenser. One or more of the evaporator fan and the condenser fan are located between the evaporator and the condenser in a path of the liquid condensate to distribute the liquid condensate over a condenser surface.

Additionally or alternatively, in this or other embodiments a first distribution plate is located between the evaporator and the condenser in a path of the liquid condensate. The first distribution plate includes a plurality of first distribution plate openings. The plurality of first distribution openings are configured and arranged to evenly distribute the liquid condensate over a condenser surface.

Additionally or alternatively, in this or other embodiments the first distribution plate is positioned non-parallel to the condenser surface.

Additionally or alternatively, in this or other embodiments the first distribution plate openings vary in one or more of size, spacing or shape to evenly distribute the liquid condensate over the condenser surface.

Additionally or alternatively, in this or other embodiments a second distribution plate is located between the first distribution plate and the condenser in the path of the liquid condensate. The second distribution plate includes a second distribution plate opening to direct liquid condensate collected at the second distribution plate onto the first distribution plate.

Additionally or alternatively, in this or other embodiments the second distribution plate is positioned nonparallel to the first distribution plate and nonparallel to the condenser surface.

Additionally or alternatively, in this or other embodiments the first distribution plate is positioned at a first angle to the condenser surface equal and opposite to a second angle of the second distribution plate to the condenser surface.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 4 is a plan view of an embodiment of a lower distribution plate.

The detailed description explains embodiments, together with advantages and features, by way of example with reference to the drawings.

DETAILED DESCRIPTION

Figure 1:
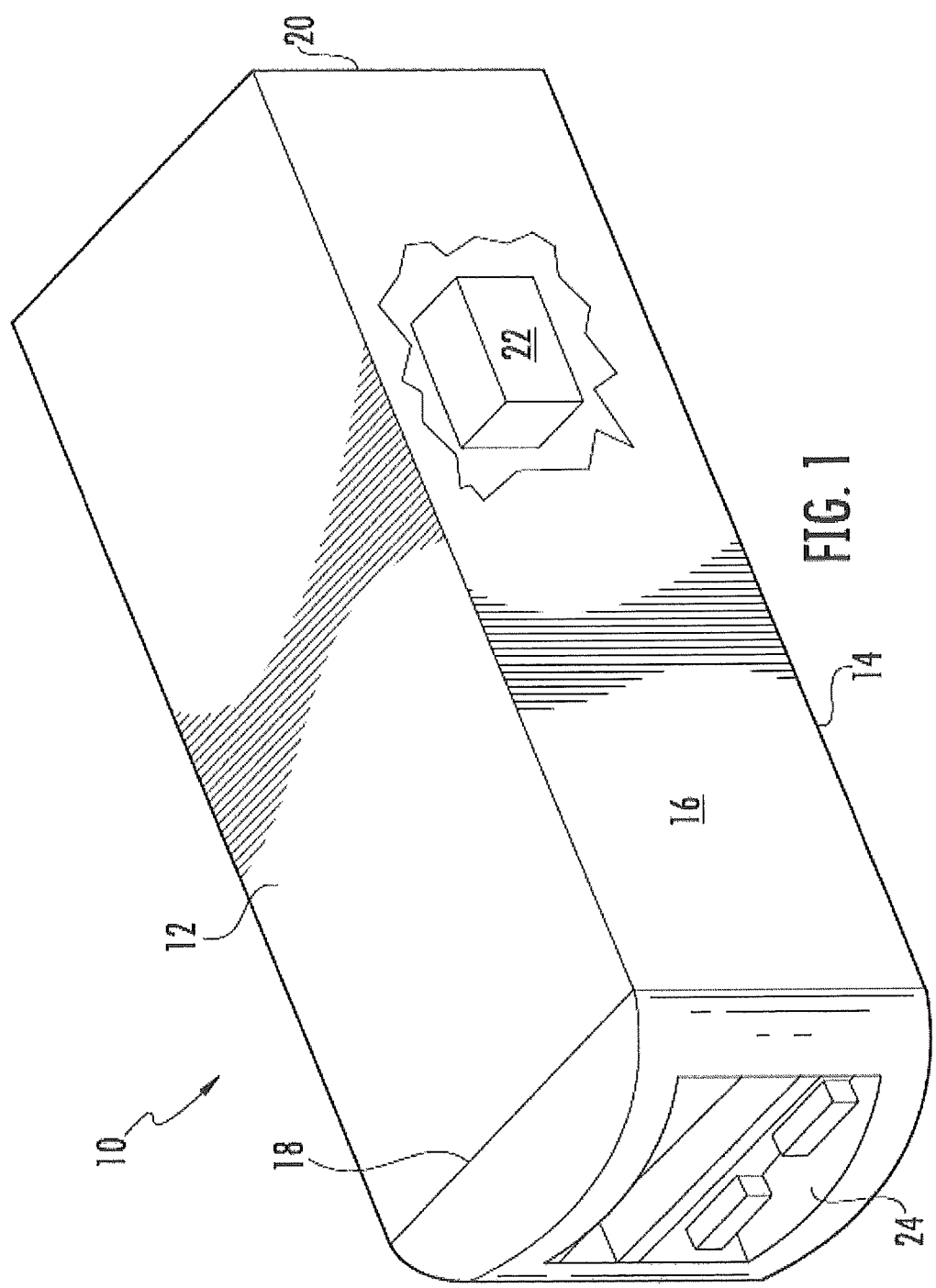
FIG. 1 is schematic view of an exterior of a cargo trailer including a heating, ventilation, air conditioning and refrigeration (HVAC&R) system.

Shown in FIG. 1 is an embodiment of a temperature-controlled cargo compartment 10, for example, a refrigerated truck or trailer. The cargo compartment 10 is formed into a generally rectangular construction, with a top wall 12, a directly opposed bottom wall 14, opposed side walls 16 and a front wall 18. The cargo compartment 10 further includes a door or doors (not shown) at a rear wall 20, opposite the front wall 18. The cargo compartment 10 is configured to maintain a cargo 22 located inside the cargo compartment 10 at a selected temperature through the use of a heating, ventilation, air conditioning, and refrigeration (HVAC&R) unit 24 located at the cargo compartment 10. The cargo compartment 10 is utilized to transport the cargo 22. The HVAC&R unit 24 is located at the front wall 18, and includes an evaporator 32 that receives a compartment airflow 34 (shown in FIG. 2) from inside the cargo compartment 10 and cools it via thermal energy exchange between the compartment airflow 34 and refrigerant flowing through the evaporator 32. The cooled compartment airflow 34 is utilized to refrigerate the cargo compartment 10 to a selected temperature. In some embodiments, the selected temperature is in the range of about 30 to 50 degrees Fahrenheit for high or medium temperature refrigeration, while in other embodiments the selected temperature may be between 0 and −30 degrees Fahrenheit for frozen good refrigeration. It is to be appreciated that these temperatures are merely exemplary and that the HVAC&R unit 24 described herein may be utilized to achieve a wide range of selected temperatures and further is readily switchable between selected temperatures. Further, while the HVAC&R unit 24 is described herein in the context of a refrigerated cargo compartment 10, it is to be appreciated that this is only one application of such an HVAC&R unit 24. One skilled in the art will readily appreciate that HVAC&R unit 24 may also be utilized in heat pump and air conditioning applications, for both residential and commercial spaces.

Figure 2:
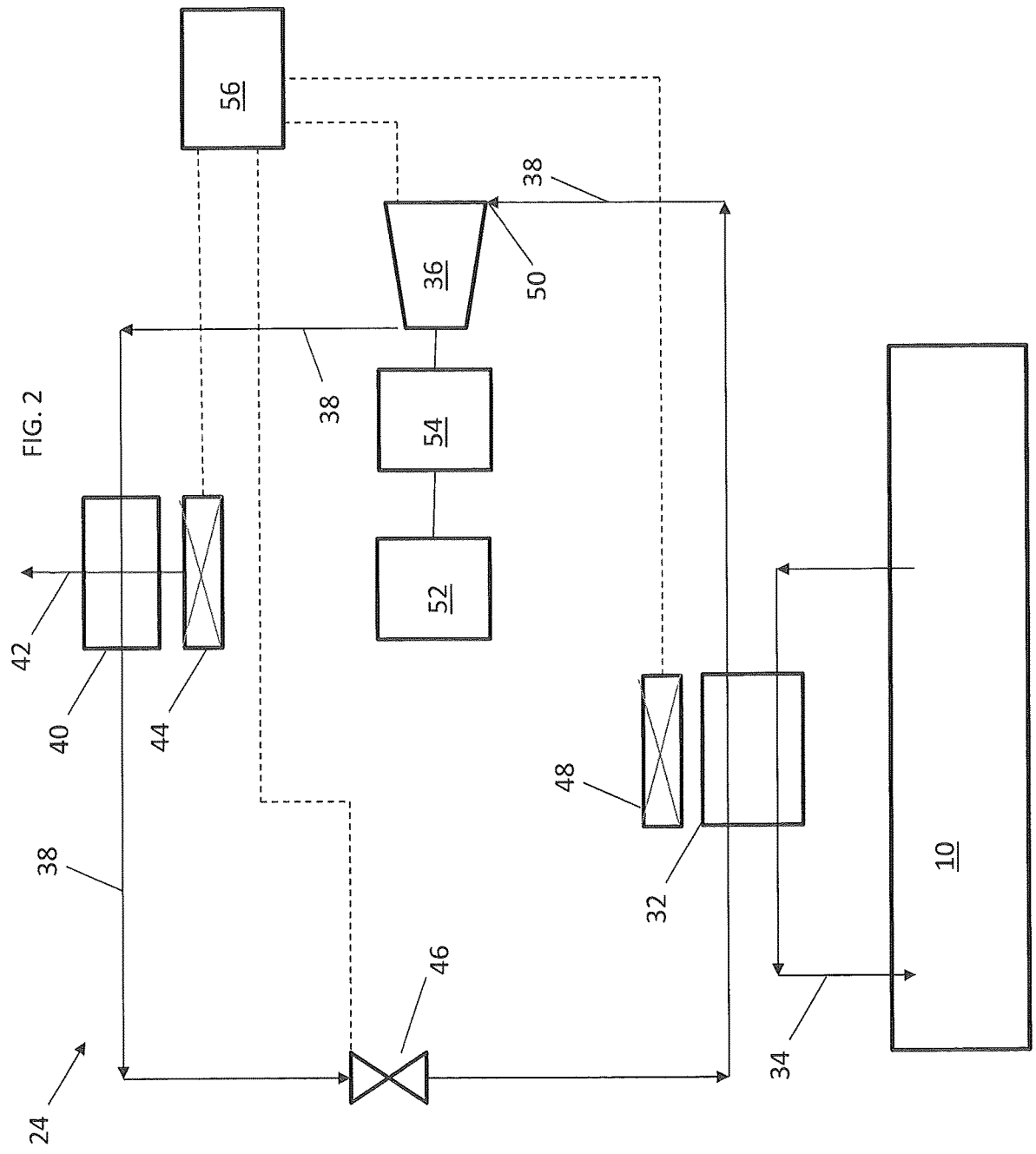
FIG. 2 is a schematic view of an embodiment of an HVAC&R system.

Referring now to FIG. 2, the HVAC&R unit 24 includes a compressor 36 which may be a vapor injection scroll compressor, or may be a compressor of a different type. The compressor 36 compresses a vapor refrigerant flow 38, and the refrigerant flow 38 changes phase into liquid at a condenser 40 through thermal energy exchange with a condenser airflow 42, typically an ambient airflow flowed across the condenser 40 by a condenser fan 44. The condenser 40 is fluidly connected to an expansion device 46. The expansion device 46 is fluidly connected to the evaporator 32, where the compartment airflow 34 is cooled and the refrigerant flow 38 is boiled through thermal energy exchange at the evaporator 32. In some embodiments, the compartment airflow 34 is urged across the evaporator 32 by one or more evaporator fans 48. The vaporized refrigerant flow 38 is then returned to compressor inlet 50 of compressor 36.

The compressor 36 is powered by a power source, for example, an engine 52, fueled by, for example diesel or natural gas. The engine 52 is connected to the compressor 36 either directly or via an intervening electrical generator 54 as shown to derive AC power to drive the compressor 36. The electrical power generated at the electrical generator 54 may also be utilized to drive the condenser fan 44, the evaporator fan 48 and other auxiliary components of the HVAC&R unit 24. A controller 56 is operably connected to components of the HVAC&R unit 24, such as the compressor 36, the engine 52, the condenser fan 44, the expansion device 46 and the evaporator fan 48 to monitor and control their operation.

Figure 3:
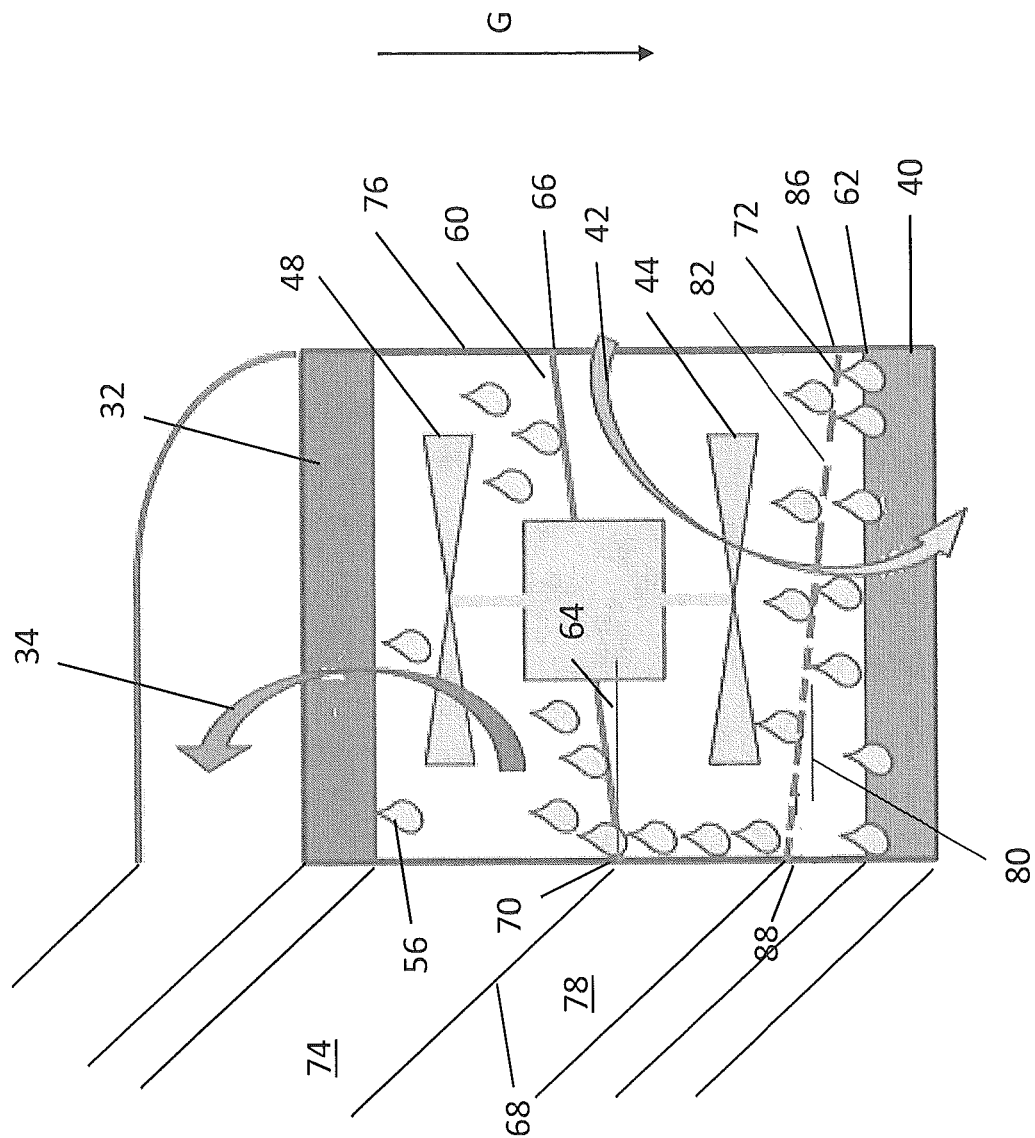
FIG. 3 is a side view of a layout of an embodiment of a portion of an HVAC&R system.

Referring now to FIG. 3, an exemplary layout of the condenser fan 44, the evaporator fan 48, the evaporator 32 and the condenser 40 is shown. As shown, the evaporator 32 is located vertically above the condenser 40 relative to a direction of gravity, shown as "G" in the FIG. These elements are all at least partially enclosed in a housing 74. As the compartment airflow 34 passes over the evaporator 32 and is cooled, condensate 56 forms on the evaporator 32. Under the force of gravity, the condensate 56 then falls from the evaporator 32 toward the condenser 40 and impacts on the condenser 40. The condensate 56 impacting on the condenser 40 to increase condensation of a flow of refrigerant 38 (See FIG. 2) flowing through the condenser 40, increasing the capacity of the condenser 40 with the same condenser airflow 42.

In some embodiments, the condenser fan 44 and/or the evaporator fan 48 may be utilized to sling the condensate 56 across the condenser 40, distributing the condensate 56 across a surface area of the condenser 40. In other embodiments one or more distribution plates may be located between the evaporator 32 and the condenser 40 to evenly distribute the condensate 56 across the condenser 40 thereby achieving greater benefit of utilizing the condensate 56 at the condenser 40. In some embodiments, an upper distribution plate 60 is located between the evaporator 32 and an upper condenser surface 62. The upper distribution plate 60 is tilted at a first angle 64, such that the upper distribution plate 60 is not oriented horizontally. Thus, condensate 56 collected at the upper distribution plate 60 is directed from a first end 66 at a first housing wall 76 along a downward slope toward a second end 68 of the upper distribution plate 60 at a second housing wall 78.

The upper distribution plate 60 is provided with one or more upper plate openings 70 at the second end 68 to allow the collected condensate 68 to fall through the upper distribution plate 60 via the one or more upper plate openings 70 toward a lower distribution plate 72 located between the upper distribution plate 60 and the condenser 40. Alternatively, the system may be constructed such that the upper distribution plate 60 is located with a gap to the second housing wall 78 allowing flow of the condensate 56 from the upper distribution plate 60 toward the lower distribution plate 72.

The lower distribution plate 72 is positioned at a second angle 80 relative to the horizontal such that the condensate 56 flows downwardly from the second housing wall 78 toward the first housing wall 76. In some embodiments, the first angle 64 is equal and opposite to the second angle 80. The lower distribution plate 72 includes a plurality of lower plate openings 82 arrayed between the second housing wall 78 and the first housing wall 76. The lower plate openings 82 are arranged to provide a desired distribution of condensate 56 over an upper condenser surface 62. In some embodiments, the desired distribution is a substantially equal distribution of the condensate 56 over the upper condenser surface 62.

An embodiment of a lower distribution plate 72 is shown in FIG. 4. The lower distribution plate 72 has a first plate end 86 located at the first housing wall 76 and a second plate end 88 located at the second housing wall 78. The first plate end 86 and the second plate end 88 define a lower distribution plate width 90. The lower distribution plate 72 also has a lower distribution plate length 92. The lower distribution plate 72 of FIG. 4 is substantially rectangular, but it is to be appreciated that lower distribution plates 72 of other shapes, such a circular, oval, triangular or the like may be utilized.

As stated above, in some embodiments the lower plate openings 82 are configured such that flow of condensate 56 onto the upper condenser surface 84 is equal or uniform, regardless of location on the upper condenser surface 82. To accomplish this uniformity, the lower plate openings 82 may vary in, for example, size, shape, and/or spacing across the lower distribution plate width 90. For example, as shown in FIG. 4, at or near the second plate end 88, the lower plate openings 82 are of smaller opening area than the lower plate openings 82 at or near the first plate end 86, the lower plate opening 82 size increasing with distance from the second plate end 88 while a spacing between adjacent lower plate openings 82 also increases with distance of the lower plate openings 82 from the second plate end 88. It is to be appreciated that, while circular lower plate openings 82 are shown in FIG. 4, other lower plate opening 82 shapes, such as oval, rectangular, triangular or the like, are contemplated within the scope of the present disclosure. Further, one skilled in the art will readily appreciate that the lower plate opening 82 shape may vary on the lower distribution plate 72. For example, a combination of lower plate openings 82 with circular shapes and lower plate openings 82 with oval shapes may be utilized. Further, it is to be appreciated that while system shown utilizes an upper distribution plate 60 and a lower distribution plate 72, in some embodiments one or more intermediate distribution plates may be located between the upper distribution plate 60 and the lower distribution plate 72 to provided desired condensate flow characteristics.

Utilizing the condensate 56 in this way, instead of disposing of the condensate as a byproduct of operation of the system creates additional cooling capacity or alternatively may be utilized to reduce the power consumption of the system. Previous technology would require an increase in component sizing, leading to an increase in power consumption.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A heating, ventilation, air conditioning and refrigeration (HVAC&R) unit, comprising:
   an evaporator circulating a flow of refrigerant therethrough to cool a flow of compartment air flowing over the evaporator;
   a condenser operably connected to the evaporator to condense the flow of refrigerant therethrough;
   an evaporator fan to direct a first airflow across the evaporator; and
   a condenser fan to direct a second airflow across the condenser;
   wherein one or more of the evaporator fan and the condenser fan are disposed between the evaporator and the condenser in a path of the liquid condensate to distribute the liquid condensate over a condenser surface; and
   wherein the evaporator and the condenser are relatively positioned such that a liquid condensate at an exterior of the evaporator is directed by gravity onto an exterior of the condenser to increase an operating capacity of the condenser.

2. The HVAC&R unit of claim 1, further comprising a first distribution plate disposed between the evaporator and the condenser in a path of the liquid condensate, the first distribution plate including a plurality of first distribution plate openings, the plurality of first distribution openings configured and arranged to evenly distribute the liquid condensate over a condenser surface.

3. The HVAC&R unit of claim 2, wherein the first distribution plate is positioned non-parallel to the condenser surface.

4. The HVAC&R unit of claim 2, wherein the first distribution plate openings vary in one or more of size, spacing or shape to evenly distribute the liquid condensate over the condenser surface.

5. The HVAC&R unit of claim 2, further comprising a second distribution plate disposed between the first distribution plate and the evaporator in the path of the liquid condensate, the second distribution plate including a second distribution plate opening to direct liquid condensate collected at the second distribution plate onto the first distribution plate.

6. The HVAC&R unit of claim 5, wherein the second distribution plate is positioned nonparallel to the first distribution plate and nonparallel to the condenser surface.

7. The HVAC&R unit of claim 6, wherein the first distribution plate is positioned at a first angle to the condenser surface equal and opposite to a second angle of the second distribution plate to the condenser surface.

8. A temperature controlled cargo compartment comprising:
 a cargo compartment suitable for transporting a cargo; and
 a heating, ventilation, air conditioning and refrigeration (HVAC&R) unit operably connected to the cargo compartment, including:
 an evaporator circulating a flow of refrigerant therethrough to cool a flow of compartment air flowing over the evaporator to cool the cargo compartment;
 a condenser operably connected to the evaporator to condense the flow of refrigerant therethrough;
 an evaporator fan to direct a first airflow across the evaporator; and
 a condenser fan to direct a second airflow across the condenser;
 wherein one or more of the evaporator fan and the condenser fan are disposed between the evaporator and the condenser in a path of the liquid condensate to distribute the liquid condensate over a condenser surface; and
 wherein the evaporator and the condenser are relatively positioned such that a liquid condensate at an exterior of the evaporator is directed by gravity onto an exterior of the condenser to increase an operating capacity of the condenser.

9. The temperature controlled cargo compartment of claim 8, further comprising a first distribution plate disposed between the evaporator and the condenser in a path of the liquid condensate, the first distribution plate including a plurality of first distribution plate openings, the plurality of first distribution openings configured and arranged to evenly distribute the liquid condensate over a condenser surface.

10. The temperature controlled cargo compartment of claim 9, wherein the first distribution plate is positioned non-parallel to the condenser surface.

11. The temperature controlled cargo compartment of claim 9, wherein the first distribution plate openings vary in one or more of size, spacing or shape to evenly distribute the liquid condensate over the condenser surface.

12. The temperature controlled cargo compartment of claim 9, further comprising a second distribution plate disposed between the first distribution plate and the evaporator in the path of the liquid condensate, the second distribution plate including a second distribution plate opening to direct liquid condensate collected at the second distribution plate onto the first distribution plate.

13. The temperature controlled cargo compartment of claim 12, wherein the second distribution plate is positioned nonparallel to the first distribution plate and nonparallel to the condenser surface.

14. The temperature controlled cargo compartment of claim 13, wherein the first distribution plate is positioned at a first angle to the condenser surface equal and opposite to a second angle of the second distribution plate to the condenser surface.

* * * * *